June 1, 1954  E. MILLER ET AL  2,680,210
TRIPLE SWEEP SCOPE

Filed Sept. 18, 1945  2 Sheets-Sheet 1

INVENTORS
EDWARD MILLER
RALPH E. MEAGHER
BY
Ralph L Chappell
ATTORNEY

June 1, 1954

E. MILLER ET AL 2,680,210

TRIPLE SWEEP SCOPE

Filed Sept. 18, 1945

INVENTORS
EDWARD MILLER
RALPH E. MEAGHER

BY

Ralph L Chappell

ATTORNEY

Patented June 1, 1954

2,680,210

UNITED STATES PATENT OFFICE 2,680,210

TRIPLE SWEEP SCOPE

Edward Miller, Medford, and Ralph E. Meagher, Watertown, Mass., assignors, by mesne assignments, to the United States of America as represented by the Secretary of the Navy Application September 18, 1945, Serial No. 617,135

15 Claims. (Cl. 315—24)

The present invention relates to target indicating and range measuring devices for echo detection systems, and more particularly to the provision of a plurality of time bases of different speeds and range coverages simultaneously on the face of one cathode ray tube indicator.

The ability of radio echo detection systems to detect objects is based on the fact that radio waves are reflected by objects in their path. Reflection occurs most readily when radio waves of the higher frequencies are being used. The distance from a radio echo detection system to a reflecting object can be measured by measuring the time taken by a radio wave going from the said echo detection system to the object and returning to the system. This distance is known as the range of the object or target. Time is a measure of distance for the reason that radio waves travel at constant speed, namely the speed of light. Accordingly the time taken for a radio wave to travel from a radio wave generator to an object one mile away and return to the generator is 12.2 microseconds. The lapse of time of 12.2 microseconds in the travel of radio waves to and from an object to produce an echo is equivalent to a range of one mile to that object. The fact that radio waves travel at the speed of light and that these waves can be reflected by objects were predicted by Maxwell and verified by Hertz prior to the year 1894.

Since the times involved in measuring the ranges of objects detected by radio wave echoes are of the order of microseconds, cathode ray tubes are used as the time measuring devices. Simultaneously with the transmission of radio energy, the beam of the cathode ray tube is caused to be deflected across the face of the tube at a uniform rate of speed. Deflection of the beam is had usually by applying a substantially linear saw-tooth voltage wave to the proper deflection plate of the cathode ray tube. The line drawn across the face of the cathode ray tube by the end of the deflected beam is called a time base. Returning echo pulses are caused to appear upon this time base. The time base is calibrated in yards or miles and the position of the echo pulse upon the time base is an indication of the range to the reflecting target.

In practical radio echo detection systems, it has been found advisable to have various range scales or various time bases of different speeds in order to be able to detect targets lying within specific regions. Thus, for example, a radio echo detection system may present a choice of three range scales. The first scale may display targets lying within a range of four or five miles from the system. The second scale may present targets lying within twenty miles from the system, and the third scale may present targets lying within a range of eighty or a hundred miles from the system. A time base or range scale presenting targets lying within a hundred or two-hundred or even three-hundred miles of the radio echo detection system is common in many systems. In radio echo detection systems in use heretofore, the operator of the system has been able to select which one of the many range scales provided that he wishes to use at the moment. Selection is made by means of a range selector switch which, by selecting the proper circuit constants, will cause the beam of the cathode ray tube to be deflected across the face of the tube at a predetermined and desired rate of speed.

Although a target indicating system which affords a selection of range scales offers the advantage that a proper scale may be available at the choice there are disadvantages. One of these disadvantages is the fact that frequent shifting of range scales may be necessary in order to properly detect targets lying at various ranges from the echo detection system. Another and greater disadvantage follows from the fact that range selector switches very often develop defects in the course of constant use. As a result circuit trouble may develop in the range indicating system. Our invention eliminates these and other disadvantages.

It is an object of our invention to provide upon the face of a single cathode ray tube a plurality of different range scales simultaneously.

It is another object of our invention to provide such range scales that will display targets lying near, at medium distances and far from the echo detection system.

It is a further object of our invention to provide a multi-sweep range indicating system that will be automatically synchronized.

It is a still further object of our invention to provide such a range indicating system that will require few more tubes than usual indicating systems.

Other objects and features of our invention will become apparent upon a careful consideration of the following detailed description when taken together with the accompanying drawings, the figures of which illustrate a typical embodiment of the invention.

Figure 1:
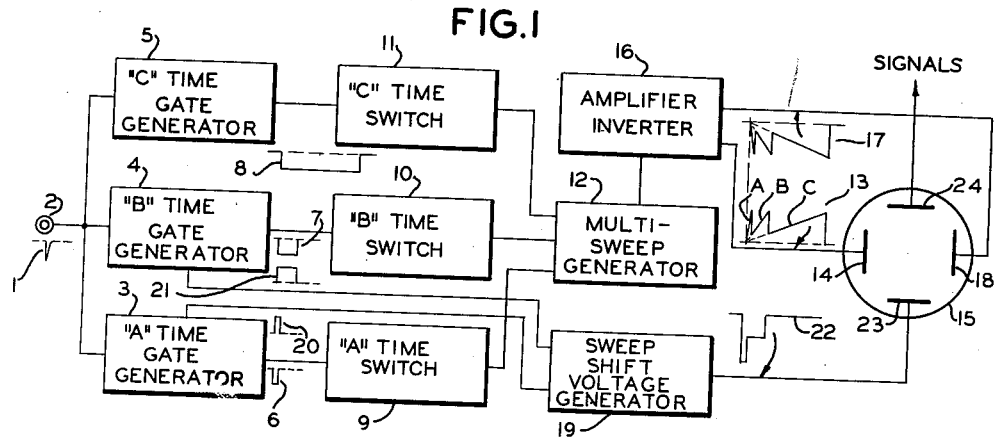
Fig. 1 is a block diagram of a system in accordance with our invention for presenting upon the face of a cathode ray tube three different range scales simultaneously.

In Fig. 1 a negative trigger pulse 1 is applied through a terminal 2 to three negative gate voltage generators 3, 4 and 5 respectively. The first or "A" gate generator 3 generates a short, negative, rectangular voltage wave 6, of 48.8 microseconds duration, upon being triggered by the trigger pulse 1. The second or "B" gate generator 4 generates a medium sized, negative, rectangular voltage wave 7 of 244 microseconds duration, upon being triggered by the trigger pulse 1. The last or "C" gate generator 5 generates a relatively very long, negative, rectangular voltage wave 8 of 976 microseconds duration, upon being triggered by the same trigger voltage 1. The negative rectangular gate voltage pulses 6, 7 and 8 start simultaneously. The duration of the shortest gate pulse 6, 48.8 microseconds, is the time necessary for a radio wave pulse to travel four miles and return. This is also the time necessary for a time base to measure a range of four miles. The duration of the medium-sized negative gate voltage pulse 7, 244 microseconds, is equivalent to a range of twenty miles. The duration of the longest negative rectangular gate voltage pulse 8, 976 microseconds, is the time equivalent to a range of eighty miles in a radio echo detection system.

Each of the negative gate voltage pulses 6, 7, and 8 respectively is fed into and operates a time switch 9, 10 or 11 respectively. Each time switch 9, 10 or 11 is opened by the negative rectangular pulse 6, 7 or 8 respectively, applied thereto. The time switches 9, 10 and 11 are all opened simultaneously and each is closed upon the termination of the negative gate pulse 6, 7, or 8, respectively, applied thereto.

The time switches 9, 10 and 11 are each connected to a multi-sweep generator 12 in a fashion that will be explained in connection with Fig. 2. The multisweep generator 12 generates a triple saw-tooth voltage wave 13 having three successive slopes A, B, and C each of a different rate of climb, or speed. The exact nature of the triple saw-tooth voltage wave 13 is explained in detail in Fig. 4 hereinbelow.

The triple saw-tooth voltage wave 13 is applied to the left-hand horizontal deflection plates 14 and 18 of a cathode ray tube 15 through an amplifier-inverter 16. The amplifier-inverter 16 passes the triple saw-tooth voltage wave 13 generated by the multi-sweep generator 12 and also generates an inverted triple saw-tooth voltage wave 17 which is the voltage image in a negative fashion of the original triple saw-tooth voltage wave 13. The inverted triple saw-tooth voltage wave 17 is fed to the right hand horizontal deflection plate 18 and the original triple saw-tooth voltage wave 13 to the left hand plate 14 of the cathode ray tube 15. The use of horizontal deflection voltages made up of an original voltage and its image in this manner is called "push-pull deflection" and is common in cathode ray tube systems to provide substantially undistorted deflection of the cathode ray beam.

The upwardly sloping side A, B, or C of each tooth of the triple saw-tooth voltage wave 13 is a horizontal sweep voltage. Thus there are three horizontal sweep voltages occurring successively, each slower than the preceding one, providing therefore three different time bases on the face of the cathode ray tube 15. In order that the three different time bases that are caused by the triple saw-tooth voltage wave 13 may be seen separately on the face of the cathode ray tube 15, it is necessary that the three sweeps hereinabove mentioned be separated. A sweep shift voltage generator 19 is provided to separate the three sweeps produced by the triple saw-tooth voltage wave 13. The sweep shift voltage generator 19 is actuated by two positive rectangular voltage pulses 20 and 21 respectively. The shorter positive rectangular pulse 20 starts with and has the same duration as the negative rectangular pulse 6 produced by the "A" gate generator 3 and is produced by the same generator 3. A longer positive rectangular voltage pulse 21 is produced by the "B" gate generator 4 and has the same duration and starts simultaneously with the negative rectangular voltage wave pulse 7 produced by that generator. The two pulses 20 and 21 are applied to the sweep shift voltage generator 19 and added in the output of that generator to form a negative voltage pulse 22. In its initial stage the negative pulse 22 has a high output which is the result of the voltages of the pulses 20 and 21 being added together. Upon the termination of the pulse 20 the output pulse 22 drops in voltage to a lower negative value which results only from the pulse 21. Thus the sweep shift pulse 22 is a negative voltage pulse having two different negative values one after the other. The negative sweep shift pulse 22 produced by the sweep shift voltage generator 19 is applied to a vertical deflection plate 23 of the cathode ray tube 15.

Figure 3:
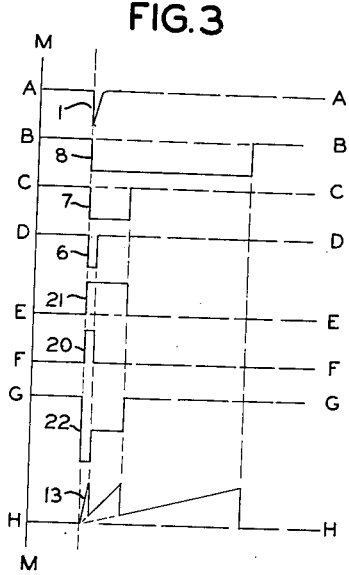
Fig. 3 is a diagram showing the synchronization of pulses in the system of Fig. 1.
Figure 5:
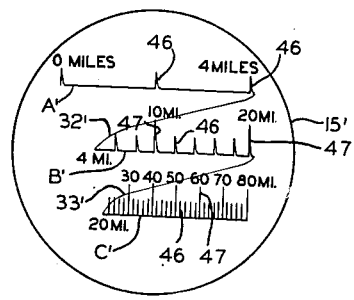
Fig. 5 illustrates the appearance of the face of a cathode ray tube the electron beam of which has been actuated by a system similar to that of Fig. 1.

As is shown in Fig. 3, discussed hereinbelow, the sweep shift voltage pulse 22 and the triple saw tooth voltage wave 13 begins simultaneously with the trigger pulse 1. After the expiration of 48.8 microseconds, the first sweep A of the triple saw tooth voltage wave 13 is terminated. Simultaneously, the sweep shift pulse 22 drops to a lower negative value. This permits the next sweep B of the triple saw tooth voltage wave 13 to start at a different vertical level on the face of the cathode ray tube 15, and to trace a separate and distinct time base. After the expiration of 244 microseconds, the second sweep B and the sweep shift voltage pulse 22 will terminate simultaneously. The third sweep C then will start at still another vertical level on the face of the cathode ray tube 15, and trace still a third separate and distinct time base. The appearance of three time bases that may be furnished by a triple saw tooth voltage wave 13 and a properly synchronized sweep shift voltage 22 is illustrated in Fig. 5, and will be discussed in greater detail hereinbelow. Echo signals may be applied to another vertical deflection plate 24 of the cathode ray tube 15.

Figure 2:
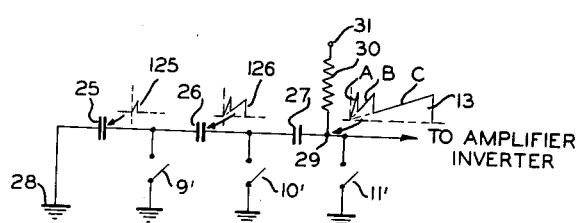
Fig. 2 is a schematic diagram of a triple sweep generator similar to the multi-sweep generator of Fig. 1.

In Fig. 2 there is illustrated the circuit of a multi-sweep generator such as that embodied in the multi-sweep generator block 12 in Fig. 1. Three capacitors 25, 26, and 27 are arranged in series and connected at one end to ground 28. The other end 29 of this arrangement of three capacitors is connected through a resistor 30 to a source of positive voltage at the connection point 31. The resistor 30 is a charging resistor. Each of the capacitors 25, 26, and 27 respectively is connected at its side furthest removed from ground 28 through a switch 9', 10', or 11' respectively to ground. The switches 9', 10', and 11' correspond to the "A," "B," and "C" gate switches 9, 10, and 11 respectively of Fig. 1. As explained in Fig. 1, the switches 9, 10, and 11 are initially closed and are opened by the gate pulses 6, 7, and 8 respectively. So also do switches 9', 10', and 11' remain closed during the time when no saw-tooth wave 13 is being generated by the apparatus of Fig. 2. With the switches 9', 10', and 11' all closed, all the condensers 25, 26, and 27 are shorted out and current flows through the resistor 30 from the source of positive voltage at the terminal 31 to ground through the switch 11'.

Let it be assumed that the three switches 9', 10', and 11' are all simultaneously opened but that the switch 9' is closed after 48.8 microseconds, that the switch 10' is closed after 244 microseconds and that the switch 11' is closed after 976 microseconds. This is exactly what happens to the switches 9, 10, and 11 in Fig. 1. When the switches 9', 10', and 11' are all simultaneously opened, the three condensers 25, 26, and 27 begin to charge in series through the resistor 31, the side furthest from ground 28 being the positive side of each condenser 25, 26, and 27. The voltage at the connection point 29 then begins to rise steeply from the ground level in a substantial linear fashion, forming the first sweep voltage A in the triple saw-tooth wave 13. After 48.8 microseconds, the switch 9' between the capacitors 25 and 26 is closed and the left-hand side of the capacitor 26 then falls substantially instantaneously to the ground level, bringing the right-hand, or high-voltage plate of the capacitor 27 down toward ground but not to ground. The voltage level to which the first tooth of the triple saw-tooth voltage wave 13 falls is that voltage level had by the right-hand sides of the remaining two capacitors 26 and 27 in series above ground.

The capacitors 26 and 27 continue to charge starting at this new voltage level, but the new charging rate is that determined by the magnitudes of the remaining two capacitors 26 and 27 alone. The new sweep voltage B in the saw-tooth voltage wave 13 has a different slope from the first sweep voltage A because the remaining two capacitors 26 and 27 in series have a different total capacity from the original three capacitors 25, 26, and 27 in series. After the elapse of 244 microseconds from the initial charging of the three capacitors 25, 26, and 27 in series the switch 10' is closed and the second sweep voltage B is terminated. The voltage on the left-hand side of the last capacitor 27 falls toward ground substantially instantaneously, and the triple sawtooth voltage wave 13 reaches a voltage which is the voltage that would be had by the right-hand side of the last capacitor 27 alone with its left-hand side connected to ground.

The last capacitor 27 then continues to charge at a rate which is determined by the magnitude of this capacitor 27 alone, forming the third sweep voltage C of the triple saw-tooth voltage wave 13. The third sweep voltage C continues until the elapse of 976 microseconds from the time of starting. After 976 microseconds the third switch 11' is closed and the triple saw-tooth voltage wave 13 is terminated, and its voltage falls to ground potential since the right-hand side of the last capacitor 27 is grounded by the switch 11'. The hereinabove described sequence of events by which the triple saw-tooth voltage wave is generated may now be repeated.

Figure 4:
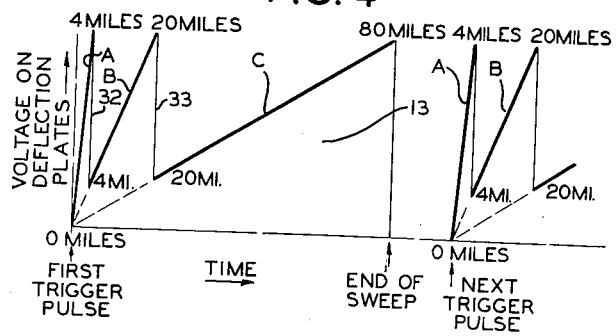
Fig. 4 is a voltage time graph of the triple saw-tooth voltage wave developed by the apparatus of Fig. 2.

The voltage 125 on the right-hand plate of the first capacitor 25 rises during the charging cycle at the same rate as the first sweep A, but only a short distance, inasmuch as the capacitor 25 is only a part of the capacitor network in series. This voltage on the right-hand plate of the first capacitor 25 falls to ground potential when the switch 9' is closed. Similarly the voltage 126 on the right-hand plate of the second capacitor 26 executes two saw-teeth and then falls to ground when the switch 10' is closed. The voltage on the right-hand plate of the last capacitor 27 completes the entire triple saw-tooth voltage wave 13 since it will not fall to ground until the third switch 11' has been closed after the lapse of 976 microseconds. The complete nature of the triple saw-tooth voltage wave 13 is illustrated in Fig. 4. It should be obvious that the apparatus of Fig. 2 is susceptible of simple modifications to provide a multiple saw-tooth voltage wave providing any desired number of sweep voltages.

As hereinabove stated, Fig. 4 illustrates the complete voltage form of the triple saw-tooth voltage wave 13. The three sweep voltages A, B, and C are indicated in heavy shaded lines. These are the sweep voltages that are applied to the cathode ray tube 15. The first tooth of the triple saw-tooth wave 13 falls substantially instantaneously toward ground after the lapse of 48.8 microseconds, but reaches a point that would have been had if the last two capacitors 26 and 27 had initially started to charge alone from the zero voltage level as indicated by a dotted line at the lower left-hand corner of the voltage-time graph. The slope 32 of the return voltage is accordingly relatively very steep. The second tooth of the triple saw-tooth voltage wave 13 falls substantially instantaneously toward ground after the lapse of 244 microseconds, and reaches a point that would have been reached by the last capacitor 27 alone had it initially been charged from the zero voltage condition, also as indicated by a dotted line at the lower left-hand corner of the voltage-time graph. The slope 33 of the second return voltage is also relatively very steep. The last sweep voltage C has a longer slope, and this is a sweep voltage for the twenty to eighty mile range.

Fig. 3 is a graph illustrating the time relationship existing upon the various important pulses of the organization of Fig. 1. The trigger pulse 1 is illustrated on line A—A. The negative rectangular gate voltages 8, 7, and 6 produced by the "C," "B," and "A" gate generators respectively, are illustrated on the lines B—B, C—C, and D—D. The positive rectangular voltages 21 and 20 produced by the gate generators "B" and "A" are shown on the lines E—E and F—F. The negative sweep shift voltage 22 produced by the sweep shift voltage generator 19 is illustrated on the line G—G. The triple saw-tooth voltage wave 13 produced by the multi-sweep generator 12 through the amplifier inverter 16 is illustrated on the line H—H. The line O—O illustrates the time of starting of all the hereinabove mentioned pulses and voltage waves. It is to be noted that the voltage waves and pulses hereinabove described in connection with Fig. 3 all start simultaneously. The line M—M is merely a reference line which has no relation to time but is merely a starting point for all the graph lines A—A, B—B, C—C, D—D, E—E, F—F, G—G and H—H.

In Fig. 5 there is illustrated the appearance of the face of a cathode ray tube 15' when the triple saw-tooth voltage wave 13 is applied to the horizontal deflection plates thereof and when a sweep shift voltage 22, synchronized as hereinabove explained, is applied to the vertical deflection plates thereof. The time base, or sweep A', corresponds to the initial steep slope or sweep voltage A of the saw-tooth voltage wave 13, and is applied from zero to four miles, this being the initial sweep. At the end of four miles, or 48.8 microseconds the sweep shift voltage 22 is altered and the sweep drops. At the same time the sweep returns toward the left-hand side of the face of the cathode ray tube 15', and thereupon starts at the time base or sweep B' starting with a range of four miles and continuing to an ultimate range of twenty miles. A faint return trace 32' will be seen, corresponding to the steep return voltage 32 of Fig. 4. The sweep B' corresponds to the second sweep voltage B of the triple saw-tooth voltage wave 13. At the end of twenty miles, or 244 microseconds the sweep shift voltage 22 again is changed so that the sweep drops again to a new horizontal level, at the same time being returned toward the left by the drop 33 of the second saw-tooth of the saw-tooth voltage wave 13. A second faint return trace 33' will be seen, corresponding to the second return voltage 33 as shown in Fig. 4. Thus a third time base or sweep C' is formed starting at twenty miles and continuing horizontally to eighty miles. The return traces 32' and 33' are relatively very faint because they occur substantially instantaneously. These return traces 32' and 33' may inded be rendered invisible if the over-all intensity of the sweep pattern be low.

If vertical markers 46 are considered to have been impressed upon the sweeps A', B', and C', at ranges of two miles for each marker, there will be two markers on the A' sweep and there will be two mile markers on the B' sweep and on the C' sweep. If further, each fifth marker 47, indicating ten miles, be larger than the others, there will be a large marker for each five short markers at ten, twenty, thirty, forty, fifty, sixty, seventy, and eighty miles, all as shown in the diagram of Fig. 5. These markers 46 and 47 indicated the relative magnitudes of the range scales or sweeps A', B', and C'.

Figure 6:
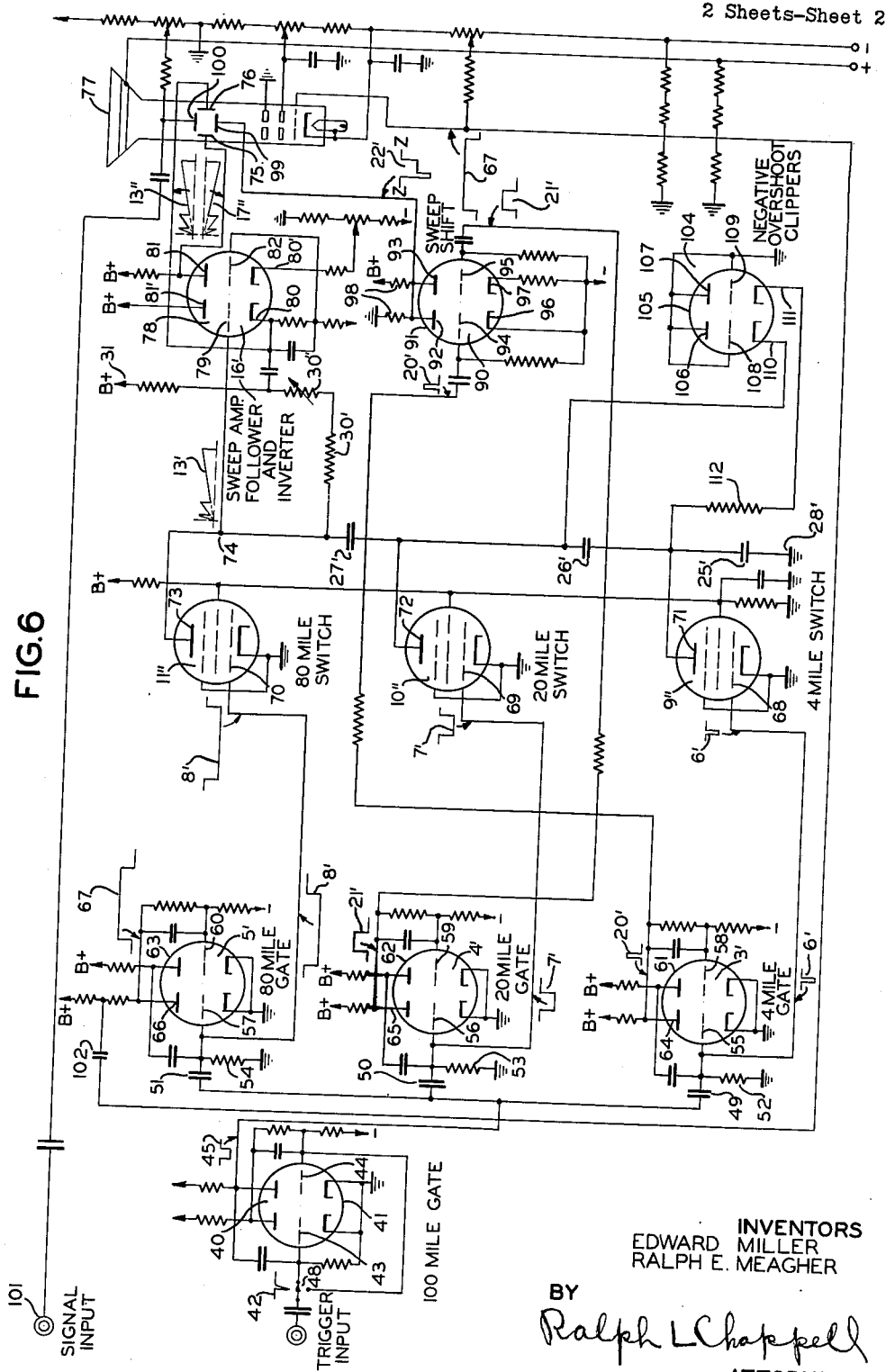
Fig. 6 is a schematic diagram of an electrical circuit constructed in accordance with our invention as shown in the block diagram of Fig. 1.

Fig. 6 illustrates a schematic diagram of an actual circuit constructed in accordance with our invention substantially as illustrated in the block diagram of Fig. 1. A multivibrator 40 having an electron tube 41 is added in the circuit of Fig. 6. This multivibrator 40 has been added for the purpose of permitting the circuit of Fig. 6 to be triggered by either a positive or a negative trigger pulse 42. When a negative trigger pulse is inserted into the circuit of Fig. 6, the left-hand grid 43 of the electron tube 41 is the control grid for triggering off the multivibrator 40. When the trigger pulse 42 is of a positive voltage nature, the right-hand grid 44 of the electron tube 41 is used to trigger the multivibrator 40. A selector switch 48 is operable by hand to choose the proper input grid 43 or 44. The multivibrator 40 has a period of 1220 microseconds and therefore produces a negative rectangular gate voltage 45 of one hundred miles equivalent range. The 100 mile negative gate voltage 45 produced by the multivibrator 40 is fed to three multivibrators 3', 4', and 5' in parallel through three capacitors 49, 50 and 51 respectively, one of which is associated with each of the three multivibrators. The three multivibrators 3', 4', and 5' correspond, in the apparatus of Fig. 6 to the three gate generators 3, 4, and 5 in Fig. 1. Each multivibrator 3', 4', or 5' comprises an electron tube 61, 62, or 63, of the double-triode type, having a left-hand half and a right-hand half.

Each of the three capacitors in parallel 49, 50 and 51 is associated with a resistor 52, 53, and 54 respectively through which the respective capacitor 49, 50 or 51 is grounded. Each capacitor 49, 50, or 51 makes with its associated resistor 52, 53, or 54 a differentiating circuit. Each of these differentiating circuits furnishes to the left-hand grid 55, 56, or 57 of the respective electron tube 61, 62, or 63, to which it is attached, a negative trigger pulse which has been generated in a known and usual manner in the resistor 52, 53, or 54 from the leading edge of the negative rectangular voltage wave 45 furnished by the multivibrator 40. The left-hand grid 55, 56, or 57 of each multivibrator 3', 4', or 5' respectively is initially at a ground potential, being grounded through its associated resistor 52, 53, or 54 respectively. Simultaneously the right-hand grid 58, 59, or 60 of each multivibrator 3', 4', or 5' respectively is at a negative potential, as indicated by a minus sign in Fig. 6. Therefore the left-hand half of each double triode 61, 62, and 63 is initially conductive, while the right-hand half of each respective double triode tube is initially non-conductive. Each multivibrator 3', 4', or 5' will deliver a negative rectangular voltage pulse 6', 7', or 8' at its left-hand grid 55, 56, or 57 when that grid has impressed upon it the negative voltage trigger pulse generated by the therewith associated differentiating circuit. This is a known and usual function of multivibrators. The shorter period multivibrator 3' delivers a negative rectangular voltage pulse 6' having a duration of 48.8 microseconds and constituting a four mile gate voltage. The medium period multivibrator 4' delivers a negative rectangular voltage pulse 7' having a duration of 244 microseconds, which is equivalent to a twenty mile gate voltage. The last and longest period multivibrator 5' delivers a negative rectangular voltage pulse 8' having a duration of 976 microseconds. This is the eighty mile gate voltage. The three negative gate voltage pulses 6', 7', and 8' correspond in the apparatus of Fig. 6 to the negative gate voltage pulses 6, 7, and 8, of Fig. 1.

Simultaneously with the delivery of the negative rectangular voltage pulses 6', 7', and 8', each multivibrator 3', 4', or 5' delivers also a positive rectangular voltage pulse 20', 21', or 67, of the same duration as the corresponding negative pulse 6', 7', or 8', from the left-hand anode 64, 65, or 66 of the electron tube 61, 62, or 63 respectively associated therewith. Thus the multivibrator 3' delivers a positive rectangular voltage pulse 20' of 48.8 microseconds duration from its left-hand anode 64, the multivibrator 4' delivers a positive rectangular voltage pulse 21' of 244 microseconds duration from its left-hand anode 65 and lastly the eighty mile gate voltage multivibrator 5' delivers a positive rectangular voltage pulse 67 of 976 microseconds duration from its left-hand anode 66. The shorter two positive pulses 20' and 21' of the apparatus of Fig. 6 correspond to the similar positive pulses 20 and 21 of Fig. 1. All six rectangular voltage pulses 6', 7', 8', 20', 21', and 67 delivered by the three multivibrators 3', 4', and 5' start simultaneously and have the same mutual time relation as the corresponding pulses 6, 7, 8, 20, and 21 of Fig. 1 as shown in Fig. 3. There is no pulse in Fig. 1 corresponding to the long positive pulse 67 of Fig. 6.

The negative rectangular gate voltages 6', 7', and 8' are fed to the control grids 68, 69, and 70 of three switch tubes 9'', 10'', and 11''. These latter three switch tubes 9'', 10'', and 11'' are equivalent in the circuit of Fig. 6 to the "A," "B," and "C" switches 9, 10, and 11, respectively of Fig. 1, and to the switches 9', 10', and 11' respectively of the apparatus of Fig. 2. The control grids 68, 69, and 70 are initially at ground potential being grounded through the resistors 52, 53, and 54 respectively connected thereto. The switch tubes 9'', 10'', and 11'' are initially in a conductive state, and the respective switches are to be considered as closed. Upon the arrival of the appropriate negative rectangular voltage pulse 6', 7' or 8' at the respective grid 68, 69, or 70, the switch tube 9'', 10'', or 11'' becomes an open switch. This is due to the fact that as the grid 68, 69, or 70 becomes negative, the tube 9'', 10'', or 11'' respectively ceases to conduct current. As each negative rectangular voltage pulse 6', 7', or 8' is terminated the respective switch tube 9'', 10'', or 11'' upon which that pulse has been impressed becomes again effectively a closed switch. Thus all three switch tubes 9'', 10'', and 11'' are open simultaneously. The four mile switch 9'' is closed after 48.8 microseconds, and the twenty mile switch 10'' is closed after 244 microseconds, while the eighty mile switch 11'' is closed after 976 microseconds. The three switch tubes 9'', 10'', and 11'' are further connected to additional apparatus in a manner equivalent to the three switches 9', 10', and 11' of Fig. 2 as will hereinafter be explained.

Three capacitors 25', 26', and 27' are connected in series with each other and with two resistors 30' and 30'' from a source of positive or B+ voltage, indicated at the terminal 31', to ground 28'. This series network of capacitors and resistors is equivalent to the corresponding network of the apparatus of Fig. 2. The anodes 71, 72, and 73 of the switch tubes 9'', 10'', and 11'' are connected between the capacitors 25', 26', and 27' in like fashion to the switches 9', 10', and 11' of Fig. 2. That is to say, the anode 71 of the first switch 9'' is connected to the aforementioned network between the capacitors 25' and 26', the anode 72 of the second switch 10'' is connected to the said network between the capacitors 26' and 27', and the anode 73 of the last switch 11'' is connected to the network at the high-voltage side of the capacitor 27'.

In similar fashion to the action of the circuit of Fig. 2 the three capacitors 25', 26', and 27' will begin to charge in series through the resistor 30' when all three switch tubes 9'', 10'', and 11'' are opened simultaneously by the application thereto of the three respective negative rectangular voltage pulses 6', 7', and 8'. Likewise the first capacitor 25', being the one nearest to ground, will be shorted to ground by the first or "A" switch tube 9'' after the expiration of 48.8 microseconds. After the expiration of 244 microseconds the next capacitor in the series 26' will be shorted to ground by the second or "B" switch tube 10''. The last capacitor 27' will be shorted to ground by the last or "C" switch tube 11'' upon the expiration of 976 microseconds. The capacitor voltage divider network made up of the three capacitors 25', 26', and 27' in series will have a charging voltage curve that has three saw-tooth waves on it, thereby comprising a triple saw-tooth voltage wave similar to the voltage wave 13 of the apparatus of Fig. 2 as shown in Fig. 4. The action of the apparatus of Fig. 2 and the capacitor network of Fig. 6 is identical. The output voltage wave 13' is taken from the capacitor network of Fig. 6 at the terminal point 74 between the charging resistor 30' and 30'' and the high-voltage plate of the last capacitor 27'.

The triple saw-tooth voltage wave 13' generated by the circuit of Fig. 6 is as aforementioned, substantially identical to the wave 13 shown in Fig. 4, or to the triple saw-tooth wave 13 of Fig. 2. This triple saw-tooth voltage wave 13' generated by the circuit of Fig. 6 is initiated by the trigger pulse 42 inserted into the circuit initially in the multivibrator 40. There will be a triple saw-tooth voltage wave generated by the circuit of Fig. 6 for each trigger pulse 42.

In order properly to apply the triple saw-tooth voltage wave of Fig. 6 to the horizontal deflection plates 75 and 76 of a cathode ray tube 77 the triple saw-tooth voltage wave of the apparatus of Fig. 6 is fed to and through a sweep amplifier inverter stage 16', which is equivalent to the amplifier inverter 16 of the apparatus of Fig. 1. The sweep amplifier inverter comprises an electron tube 78 of the double triode type, having a left-hand grid 79 upon which the triple saw-tooth voltage wave 13' is impressed. The left-hand half of the electron tube 78 functions as a cathode follower, while the right-hand half is arranged to function as an amplifier. The sweep amplifier inverter 16' has two outputs 13'' and 17'' which are in the opposite phase to each other. One triple saw-tooth voltage wave 13'' is taken from the left-hand cathode 80 of the tube 78. Thus it can be seen that the left-hand half of the double triode electron tube 78 functions as a cathode follower. A signal is taken from the left-hand cathode 80 and fed to the right hand grid 82 in order to control the right-hand half of the tube 78. The second triple saw-tooth voltage wave 17'' is taken from the right-hand anode 81 of the electron tube 78. The two grids 79 and 82 of the electron tube 78 will rise and fall together in response to the signal 13' from the capacitor triple saw-tooth wave generating network, since the left-hand cathode 80 will follow the left-hand grid 79, and the right-hand grid 82 follows the left-hand cathode 80. Therefore, the cathodes 80 and 80' will rise together and the anodes 81 and 81' will fall together as the left-hand grid 79 rises. Thus the signal on the left-hand cathode 80 will be 180° out of phase with the signal on the right-hand anode 81. Therefore the triple saw-tooth voltage waves 13'' and 17'' put out by the sweep amplifier inverter 16' will be 180° out of phase with each other.

The two triple saw-tooth voltage waves 13'' and 17'' are impressed upon the two opposite deflection plates 75 and 76 of the cathode ray tube 77, to produce push-pull deflection of the cathode ray beam thereof. Normally the two plates 75 and 76 upon which the two saw-tooth voltage waves 13'' and 17'' are impressed will be the horizontal deflection plates of the cathode ray tube 77. Thus there will be produced upon the face of the cathode ray tube 77 a repetitive series of three substantially linear time bases of different speeds. The manner in which the three time bases produced upon the face of the cathode ray tube 77 are separated from each other in order that all may be seen simultaneously will be explained hereinbelow.

The three time bases furnished by the triple saw-tooth voltage wave 13″ and 17″ are separated from each other by the sweep shift circuit 90 comprising the double triode electron tube 91. The anodes 92 and 93 of the electron tube 91 are connected together and to a point in a voltage divider resistor 98 and 98′, which resistor is connected from a source of positive voltage to ground. The grids 94 and 95 and the cathodes 96 and 97 of the electron tube 91 are all initially at a negative potential, and the anodes 92 and 93 are at an initial potential represented by the line Z—Z on the sweep-shift voltage wave 22′. Two positive rectangular voltage waves 20′ and 21′ from the 4 and 20 mile gate multivibrators 3′ and 4′, which start together as hereinabove explained, are impressed one upon each grid 94 and 95 respectively of the electron tube 91. Accordingly each half of the electron tube 91 begins to conduct simultaneously and each anode 92 and 93 drops in potential, from the value represented by the line Z—Z. Since the drop in potential of each anode 92 or 93 is due to a current flow in the resistor 98, the drops in potential of the two anodes 92 and 93 will be added in the resistor 98. This is due to the unique circuit involved in the anodes 92 and 93 and the resistor 98. Thus the two anodes 92 and 93 together will put out a negative voltage wave 22′ which initially is the result of the two impressed positive rectangular voltages 20′ and 21′. Upon the termination of the 48.8 microsecond positive rectangular voltage 20′, the remaining rectangular voltage 21′ will continue to maintain the right-hand side of the electron tube 91 conducting, while the left-hand side of the electron tube 91 ceases to conduct. Thereafter the negative sweep shift voltage wave 22′ will be somewhat less negative than initially, due to the drop in the current flowing in the resistor 93, which in turn is due to the cessation of the rectangular voltage 20′ impressed upon the left-hand grid 94 of the electron tube 91. The negative voltage pulse 22′ is the sweep shift pulse and is equivalent to the pulse 22 from the sweep shift voltage generator 19 of Fig. 1. The time relationship among the negative voltage pulse 22′ and the positive pulses 20′ and 21′ in the circuit of Fig. 6 is substantially identical to the time relationship among the pulses 20, 21, and 22 as shown in Fig. 3.

The sweep shift pulse 22′ is applied to a vertical deflection plate 99 of the cathode ray tube 77 in the manner hereinabove explained in connection with Fig. 1 and Fig. 5. The sweep shift voltage pulse 22′ causes the separation of the horizontal sweep voltages of the triple saw-tooth voltage waves 13″ and 17″, as explained in the discussion of Fig. 5. Echo pulses may be impressed upon the opposing vertical deflection plate through the terminal point 101.

The positive rectangular pulse 67 generated by the eighty mile gate multivibrator 5′ is used as a brightness control gate pulse for the cathode ray tube 77. This positive rectangular voltage pulse 67 is fed through a capacitor 102 to a control grid 103 for controlling the brightness of the cathode ray beam in the tube 77. In this manner the cathode ray tube 77 is caused to become brightened during the existence of the three sweep voltages of the triple saw-tooth voltage waves 13″ and 17″ but to remain darkened during the absence of said sweep voltages. This is a usual and ordinary procedure.

A negative overshoot clipper circuit 104 is provided for the capacitor voltage divider circuit that generates the triple saw-tooth voltage wave 13′. This negative overshoot clipper circuit 104 comprises a double triode electron tube 105. The anodes 106 and 107 and the grids 108 and 109 of this electron tube 105 are all grounded. The left-hand cathode 110 of the electron tube 105 is connected to the capacitor voltage divider network between the capacitors 26′ and 27′. The right-hand cathode 111 is connected to the capacitor voltage divider network between the capacitors 25′ and 26′ through the resistor 112. When the four mile switch tube 9″ closes, terminating the positive voltage on the high-voltage plate of the capacitor 25′ and bringing this voltage to ground, there will be a tendency for the said positive voltage to oscillate below ground. This tendency will be inhibited by the fact that the right-hand cathode 111 of the tube 105 will drop below ground and cause its half of the double triode 105 to conduct, thereby shorting out any negative overshoot tendency. The action of the left-hand half of the electron tube 105 is similar with respect to the upper or positive plate of the capacitor 26′ controlled by the twenty mile range switch 10″. The negative overshoot clipper circuit 104 prevents jitter and oscillation at the end of the four and twenty mile range sweeps.

Although we have shown and described only a certain specific embodiment of our invention, we are fully aware of the many modifications possible thereof. It is to be understood that the gate times and sweep voltage durations mentioned herein are by way of example only, and that other time values may be used as desired. Therefore this invention is not to be limited except insofar as is necessitated by the prior art and the spirit of the appended claims.

We claim:
1. In an electrical circuit, the combination with a cathode ray tube of means for producing on the face of said tube a repetitive series of three substantially linear mutually parallel time bases, the latter two of said time bases being each of relatively slower speed and longer time duration than the preceding time base, and means for laterally separating said time bases in said series.

2. The apparatus of claim 1 wherein the initial instant of the first of said time bases is the time of origin of said series, the initial instant of the second of said time bases is substantially simultaneous with the final instant of said first time base, and the initial instant of the last of said time bases is substantially simultaneous with the final instant of said second time base.

3. A system for producing a series of time bases on the face of a cathode ray tube comprising, a cathode ray tube, means for deflecting the electron beam of said tube from a starting point in a first direction at a first substantially uniform rate of speed for a first period of time, means for substantially instantaneously returning said beam a predetermined distance toward said starting point, means for deflecting said beam a second time in said first direction at a second substantially uniform rate of speed for a second period of time, means for substantially instantaneously returning said beam another predetermined distance toward said starting point, means for deflecting said beam a third time in said first direction at a third substantially uniform rate of speed for a third period of time, means for substantially instantaneously returning said beam to said starting point, said rates of speed and said periods of time being all different from each other, and means for substantially instantaneously deflecting said beam in a direction substantially transverse to said first direction during the return trips of said beam toward said starting point.

4. An electrical system for producing a plurality of time base traces on the face of a cathode ray tube comprising, means for deflecting the electron beam of said tube from a starting point in a predetermined direction, means for returning said beam a predetermined distance toward said starting point, means for repeating the deflecting and returning process at different speeds, and means for laterally displacing each of said time base traces one from the other.

5. In combination with a radar system, an electrical circuit for simultaneously displaying a plurality of range-indicating time base traces comprising, a cathode ray tube, means for deflecting the electron beam of said tube from a starting point in a predetermined direction, means for returning said beam toward said starting point, means for displacing said beam in a direction transverse to said predetermined direction during said return trip, means for repeating said deflecting and said return trips at progressively changing speeds, and means for laterally separating each of said time base traces made by said deflecting trips of said electron beam.

6. In combination with a radar system, a multiple range indicator comprising, a cathode ray tube, a first voltage generator of pulses of a first predetermined time duration responsive to an applied signal, a first sawtooth wave generator responsive to said first voltage generator and operative upon the first deflection elements of said cathode ray tube, a second voltage generator of pulses of a second predetermined time duration responsive to said applied signal, a second sawtooth wave generator responsive to said second voltage generator and operative on said first deflection elements of said cathode ray tube, and a third voltage generator operative on the second deflection elements of said cathode ray tube whereby two laterally separated linear time base traces are presented upon the face of said cathode ray tube.

7. A multiple scale indicator comprising, a first long gate pulse generator, a second intermediate gate pulse generator, a third short gate pulse generator, means for generating a composite sawtooth wave in three continuous sections, each of said sections being related in duration to the length of one of said gate pulses, means for generating a stepped square wave having three voltage levels, a cathode ray tube, means for applying said composite sawtooth wave to the horizontal deflection plates of said cathode ray tube, and means for simultaneously applying said stepped square wave to the vertical deflection plates of said cathode ray tube, each of the voltage levels of said stepped square waves coinciding in time of application with a section of said sawtooth wave, whereby three separated linear traces of different speeds are provided on the screen of said cathode ray tube.

8. A multiple scale indicator comprising, a source of trigger pulses, first, second, and third gate pulse generators for producing long, intermediate, and short voltage pulses, respectively, a multisweep voltage generator for generating a three-section sweep voltage composed of first, second, and third sawtooth waves of similar amplitude but of differing rise times, said first, second, and third rise times being substantially equal to the durations of said long, intermediate, and short voltage pulses, respectively, a cathode ray tube, means for applying said three-section sawtooth waves to first deflection elements of said cathode ray tube, means for generating a stepped square voltage pulse having three distinct voltage levels, two of said levels corresponding in duration to said intermediate and long voltage pulses, respectively, and means for applying said stepped square voltage pulse to second deflection elements of said cathode ray tube to produce three laterally displaced traces of progressively decreasing speeds on the screen thereof.

9. Apparatus as in claim 8 wherein said multisweep generator comprises three series connected capacitors, a source of voltage, and three electronic switches for charging said condensers substantially consecutively from said source of voltage.

10. Apparatus as in claim 8 wherein said multisweep generator comprises three series connected capacitors, a source of voltage, means for charging said three condensers in series from said source of voltage for a period determined by said short voltage pulse, means for charging two of said condensers in series from said voltage source for a period determined by said intermediate voltage pulse, and means for charging one of said condensers from said voltage source for a period determined by said long voltage pulse.

11. In a radar system, a multiple scale indicator comprising, first, second and third gate pulse generators simultaneously responsive to a trigger voltage from said radar system, first, second and third electronic switches responsive to said first, second and third gate pulse generators, respectively, a multisweep generator controlled by said electronic switches for generating a continuous three-section sawtooth wave, each of said sections corresponding in duration to the output of one of said first, second and third gate pulse generators, a cathode ray tube having vertical and horizontal deflection elements, means for applying said three-section sawtooth wave to said horizontal deflection elements, a square wave voltage generator responsive to said second and third gate pulse generators for generating a double stepped voltage, the durations of the steps of said voltage corresponding to the durations of the outputs of said second and third gate pulse generators, respectively, and means for applying said double stepped voltage to said vertical deflection plates whereby three laterally displaced traces of progressively decreasing speeds are formed on said cathode ray tube.

12. In combination, a cathode ray tube, means for generating a composite saw-tooth wave in a plurality of continuous sections of different durations, the linearly rising portion of each section starting at different voltage levels and having the same amplitude, means for applying said composite saw-tooth voltage to the horizontal deflection elements of said cathode ray tube to produce a plurality of time base traces of different speeds on the face of said tube, and means coupled to the vertical deflection elements of said tube for laterally separating said time base traces.

13. In combination, a cathode ray tube having horizontal and vertical deflection elements, means for generating a continuous, multiple section, saw-tooth wave, said sections having the same amplitude and different slopes, means for generating a step voltage, the steps of which have time durations corresponding to the time durations of the sections of said saw-tooth wave, means for applying said saw-tooth wave to the horizontal deflection elements of said cathode ray tube, and means for applying said stepped voltage to the vertical deflection elements of said cathode ray tube.

14. In combination, a cathode ray tube having horizontal and vertical deflection elements, a source of timing signals, a plurality of pulse voltage generators operative in response to said timing signal for generating a plurality of voltage pulses having coincident leading edges and different durations, means operative in response to said voltage pulses for generating a multiple section saw-tooth voltage wave, the sections of said saw-tooth wave being of equal amplitude and having durations corresponding to said voltage pulses, means operative in response to said voltage pulses for generating a stepped voltage the steps of which have durations corresponding to said voltage pulses, means coupling said saw-tooth voltage wave to the horizontal deflection elements of said cathode ray tube, and means coupling said stepped voltage to the vertical deflection elements of said cathode ray tube whereby a plurality of laterally spaced, substantially linear, time base traces of different speeds appear on the face of said cathode ray tube.

15. In combination with a cathode ray tube, means for producing deflection of the electron beam along a sweep axis with alternate forward and return sweeps, means for varying the velocity of the beam deflection for successive forward sweeps to produce a plurality of substantially linear time base traces of different speeds, and means for laterally separating said traces.

References Cited in the file of this patent

UNITED STATES PATENTS

| Number | Name | Date |
|---|---|---|
| 2,171,216 | Koch | Aug. 29, 1939 |
| 2,189,549 | Hershberger | Feb. 6, 1940 |
| 2,312,761 | Hershberger | Mar. 2, 1943 |
| 2,368,448 | Cook | Jan. 30, 1945 |
| 2,375,709 | Thompson | May 8, 1945 |
| 2,378,383 | Arndt, Jr. | June 19, 1945 |
| 2,378,604 | Wallace | June 19, 1945 |
| 2,394,196 | Morgan | Feb. 5, 1946 |
| 2,403,429 | Anderson | July 9, 1946 |
| 2,405,231 | Newhouse | Aug. 6, 1946 |
| 2,405,238 | Seeley | Aug. 6, 1946 |
| 2,430,570 | Hulst Jr. | Nov. 11, 1947 |